US008910656B2

United States Patent
Yasuda

(10) Patent No.: US 8,910,656 B2
(45) Date of Patent: Dec. 16, 2014

(54) FLUID CONTROLLER

(71) Applicant: HORIBA STEC, Co., Ltd., Kyoto-shi (JP)

(72) Inventor: Tadahiro Yasuda, Kobe (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 68 days.

(21) Appl. No.: 13/861,209

(22) Filed: Apr. 11, 2013

(65) Prior Publication Data
US 2013/0269795 A1  Oct. 17, 2013

(30) Foreign Application Priority Data
Apr. 12, 2012 (JP) ................. 2012-091373

(51) Int. Cl.
*F16K 31/02* (2006.01)
*F16K 27/12* (2006.01)
*G05D 7/01* (2006.01)
*G05D 7/06* (2006.01)

(52) U.S. Cl.
CPC ............ *G05D 7/0106* (2013.01); *G05D 7/0635* (2013.01)
USPC ........ 137/486; 137/487.5; 137/488; 137/377; 137/382

(58) Field of Classification Search
USPC .............. 137/486, 487.5, 488, 269, 377, 382, 137/374
See application file for complete search history.

(56) References Cited

U.S. PATENT DOCUMENTS

| 2,529,254 | A | * | 11/1950 | Ives | 137/82 |
| 5,159,951 | A | * | 11/1992 | Ono et al. | 137/486 |
| 5,301,717 | A | * | 4/1994 | Goedecke | 137/884 |
| 5,303,731 | A | * | 4/1994 | Vavra et al. | 137/468 |
| 5,567,868 | A | * | 10/1996 | Craig et al. | 73/23.42 |
| 5,605,179 | A | * | 2/1997 | Strong et al. | 137/884 |
| 5,819,782 | A | * | 10/1998 | Itafuji | 137/240 |
| 5,876,424 | A | * | 3/1999 | O'Phelan et al. | 607/36 |
| 5,911,238 | A | * | 6/1999 | Bump et al. | 137/487.5 |
| 6,062,254 | A | * | 5/2000 | Brady et al. | 137/382 |
| 6,192,938 | B1 | * | 2/2001 | Redemann et al. | 137/884 |
| 6,205,409 | B1 | * | 3/2001 | Zvonar | 702/183 |
| 6,209,571 | B1 | * | 4/2001 | Itoh et al. | 137/240 |
| 6,435,215 | B1 | * | 8/2002 | Redemann et al. | 137/884 |
| 6,561,216 | B2 | * | 5/2003 | Kurosawa | 137/487.5 |
| 6,578,435 | B2 | * | 6/2003 | Gould et al. | 73/861.52 |

(Continued)

FOREIGN PATENT DOCUMENTS

JP      255123 U     4/1990

*Primary Examiner* — John Rivell
*Assistant Examiner* — Minh Le
(74) *Attorney, Agent, or Firm* — Alleman Hall McCoy Russell & Tuttle LLP

(57) ABSTRACT

A fluid controller is disclosed, having a body unit, a fluid controlling valve, pressure sensors, and a casing. The fluid controlling valve is attached to a component part attachment face of the body unit. The pressure sensors are attached to the component part attachment face so that the pressure sensing surfaces thereof are positioned substantially perpendicular to the component part attachment face and substantially parallel to the longitudinal direction. On the lateral walls of the casing, the inner surfaces thereof are arranged to be uneven, so that such sections facing the fluid controlling valve and the pressure sensors are arranged to be thin sections, whereas at least a part of such a section that does not face the fluid controlling valve and the pressure sensors is arranged to be a thick section that is thicker than the thin sections.

6 Claims, 13 Drawing Sheets

(56) References Cited

U.S. PATENT DOCUMENTS

| | | | |
|---|---|---|---|
| 6,705,341 B2 * | 3/2004 | Gill | 137/486 |
| 6,769,463 B2 * | 8/2004 | Vu | 141/98 |
| 6,802,333 B2 * | 10/2004 | Balazy et al. | 137/110 |
| 7,216,019 B2 * | 5/2007 | Tinsley et al. | 700/282 |
| 7,255,125 B2 * | 8/2007 | Fancher | 137/382 |
| 7,650,903 B2 * | 1/2010 | Yamamoto | 137/487.5 |
| 7,866,337 B2 * | 1/2011 | Chinnock et al. | 137/487.5 |
| 8,144,476 B2 * | 3/2012 | Hirose | 361/752 |
| 2007/0089788 A1 * | 4/2007 | Chinnock et al. | 137/487.5 |
| 2007/0131282 A1 * | 6/2007 | Mohammed et al. | 137/487.5 |
| 2012/0180876 A1 * | 7/2012 | Hayashi et al. | 137/486 |
| 2014/0076424 A1 * | 3/2014 | Takijiri | 137/486 |

\* cited by examiner

LONGITUDINAL DIRECTION

PARTIAL VERTICAL
CROSS-SECTIONAL VIEW
SECTIONED ACROSS PRESSURE
SENSOR 2A

PARTIAL VERTICAL
CROSS-SECTIONAL VIEW
SECTIONED ACROSS FLOW
RATE ADJUSTING VALVE 4

FLUID CONTROLLER

TECHNICAL FIELD

The present invention relates to a fluid controller that controls the pressure and/or the flow rate of a raw material gas or the like used in a semiconductor process.

BACKGROUND ART

As indicated in Patent Document 1, as a pressure sensor used in a flow rate measuring mechanism or a mass flow controller of this type, a pressure sensor is known that is configured to receive the pressure of fluid on a pressure sensing surface provided on a diaphragm or the like and to measure the fluid pressure on the basis of a positional change of the pressure sensing surface. For pressure sensors using this method, the larger the area of the pressure sensing surface of the pressure receiving member is, the higher the level of sensitivity is.

Examples of conventional mass flow controllers include one in which a pressure sensor and a flow rate adjusting valve are attached to a body that has formed therein a flow path through which a control-target fluid flows. In recent years, in particular, to meet the demand to arrange a plurality of mass flow controllers side by side in a compact manner, a mass flow controller 100' has been developed, as illustrated in FIG. 15, so as to have an oblong body 1', while a face thereof extending parallel to the longitudinal direction thereof is designated as a component part attachment face 1x', so that pressure sensors 2' and a flow rate adjusting valve 4' are attached to the component part attachment face 1x' in series along the longitudinal direction. The mass flow controller 100' is designed to keep the width-direction dimension of the entire mass flow controller compact.

However, in conventional mass flow controllers, because the pressure sensors are positioned so that the pressure sensing surfaces thereof extend parallel to the component part attachment face of the body, if we try to further reduce the width-direction dimension of the entire mass flow controller, the areas of the pressure sensing surfaces become smaller, which may lead to a decrease in the sensitivity. This is a bottleneck in the endeavor to make mass flow controllers compact and, especially, to reduce the size in the width direction.

Further, in order to provide a magnetic shield for, and to provide a protection against dust for, component parts such as the pressure sensor and the flow rate controlling valve attached to the body and in order to facilitate handling of the flow rate controller, the flow rate controller is provided with a casing that houses therein component parts such as the pressure sensor and the flow rate controlling valve. To reduce the dimension of the flow rate controller in the width direction, it is necessary to reduce the dimension of the casing in the width direction, too.

To reduce the width dimension of the casing, it is possible to thin a metal plate by performing a sheet metal process, in the same manner as conventional casings have been produced. However, this method has a problem where it is difficult to achieve a sufficiently high level of precision in the processing and where the casing is easily damaged due to an insufficient mechanical strength thereof.

CITATION LIST

Patent Literature

Patent Document 1: Japanese Utility Model Application Laid-open No. H02-55123

SUMMARY OF INVENTION

Technical Problem

In view of the problems stated above, a primary object of the present invention is to further pursue miniaturization of fluid controllers by drastically reducing the width-direction dimension from conventional examples without lowering the level of sensitivity in pressure measuring processes and by reducing the width-direction dimension of the casing while maintaining the mechanical strength of the casing.

Solution to Problem

A fluid controller according to an aspect of the present invention includes: a body unit having an internal flow path through which fluid flows; a fluid controlling valve that is attached to the body unit and controls the fluid flowing through the internal flow path; a pressure sensor that is attached to the body unit and detects a pressure in the internal flow path, and a casing that houses therein the fluid controlling valve and the pressure sensor attached to the body unit. The body unit extends in a longitudinal direction, while one of faces thereof extending parallel to the longitudinal direction is designated as a component part attachment face.

The fluid controlling valve is attached to the component part attachment face, whereas the pressure sensor is attached to the component part attachment face in such a manner that a pressure sensing surface thereof is positioned substantially perpendicular to the component part attachment face and substantially parallel to the longitudinal direction. On at least one of lateral walls of the casing extending parallel to the longitudinal direction, an inner surface thereof is arranged to be uneven so that such a section that faces the fluid controlling valve and the pressure sensor is arranged to be a thin section, whereas at least a part of such a section that does not face the fluid controlling valve and the pressure sensor is arranged to be a thick section that is thicker than the thin section.

With these arrangements, it is possible to drastically reduce the width-direction dimension (i.e., the dimension in the direction that is orthogonal to the longitudinal direction and is parallel to the component part attachment face), while keeping the pressure sensing surface of the pressure sensor large so as to enhance the pressure sensing characteristics thereof. Further, as a result, it is possible to arrange a plurality of fluid controllers side by side in a compact manner. In this situation, although it is possible to reduce the width-direction dimension of the body unit by attaching the pressure sensor in the manner stated above, it is necessary to design the width-direction dimension while taking the thickness of the casing into consideration. Thus, simply attaching the pressure sensor in the manner described above still encounters a limit in making the body unit compact. To cope with this situation in the present invention, on at least one of the lateral walls of the casing extending parallel to the longitudinal direction, such a section that faces the fluid controlling valve and the pressure sensors is arranged to be the thin section. Thus, it is possible to bring inward, in terms of the width direction, the outer surfaces of the lateral walls of the casing extending parallel to the longitudinal direction. It is therefore possible to reduce the width-direction dimension of the casing that accounts for the width-direction dimension of the body unit. Consequently, it is possible to reduce the width-direction dimension of the body unit and to make the width-direction dimension of the casing as small as possible. As a result, when a plurality of fluid controllers are arranged side by side, it is possible to avoid the situation where the casings thereof prevent the fluid controllers from being positioned close to one another. Further, on at least one of the lateral walls of the casing extending parallel to the longitudinal direction, at least a part of such a section that does not face the fluid controlling valve and the pressure sensor is arranged to be the thick section. Thus, it is possible to enhance the mechanical strength of the lateral walls of the casing with the thick section. It is therefore possible to maintain the mechanical strength of the casing. When a focus is placed on the mechanical strength of the lateral walls of the casing, it is also possible to arrange the outer surfaces of the lateral walls of the casing to be uneven. However, in that situation, when a plurality of fluid controllers are arranged side by side, the projections constituting the uneven surfaces on the outer surfaces of the casings would interfere with one another and would prevent the fluid controllers from being positioned close to one another.

As for the casing, it is possible to form the casing by performing a sheet metal process. However, when a metal plate is selected in accordance with the thin section, it is necessary to process a thin metal plate having a thickness of 0.3 mm, for example. In that situation, a problem arises where not only it is impossible to achieve a sufficiently high level of precision in the processing because the metal plate warps or the like, but also, when a boss used for fixing another component part with a screw is welded onto the metal plate, the metal plate may be damaged by being thermally deformed or being cracked. Alternatively, it is also possible to form the casing by a casting process using a mold. However, because it is difficult for melted metal (e.g., aluminum) to flow into a portion of the mold that forms the thin section having a thickness of 0.3 mm, for example, it is difficult to form the casing with this method. Thus, it is desirable to form the casing by performing a cutting process on a metal base material. By shaping the metal base material through a cutting process, it is possible to form the casing precisely. Accordingly, even in the case where a plurality of fluid controllers are arranged side by side, it is possible to avoid the inconvenient situation where the plurality of fluid controllers cannot be densely arranged side by side due to variations in the precision level of the processing performed on the casings. Further, because bosses can be integrally formed, it is also possible to solve the problem during the welding process described above.

In order to position the lateral walls of the casing as close as possible to the inside in terms of the width direction, so as to make the dimension of the casing in the width direction as small as possible, it is desirable to configure the fluid controller in such a manner that, on said at least one of the lateral walls of the casing, the thin section facing the fluid controlling valve and the pressure sensor is arranged to be thinnest compared to all other sections.

In order to determine the position of the casing in the width direction while utilizing the specific configuration of the pressure sensor, it is desirable to configure the fluid controller in such a manner that the pressure sensor includes: a flange part which has a substantially parallelepiped shape and of which a predetermined face is attached onto the component part attachment face; and a sensor main body part that has a flat shape, has a pressure sensing surface therein, and is provided on such a face of the flange part that is positioned opposite from the component part attachment face. It is desirable that the position of the casing in the width direction orthogonal to the longitudinal direction is determined by bringing the thin section facing the pressure sensor into contact with a lateral face of the flange part that extends parallel to the longitudinal direction.

It is desirable to configure the fluid controller in such a manner that the casing includes a first casing element having the shape of a substantially parallelepiped of which one of the lateral faces extending parallel to the longitudinal direction as well as the bottom face are open; and a second casing element configured to close the one of the lateral faces of the first casing element that is open. It is desirable that the second casing element is fixed to the first casing element by one or more screws. With these arrangements, it is possible to perform maintenance on the wiring or the like of the fluid controlling valve and the pressure sensor only by removing the second casing element from the first casing element. It is therefore possible to facilitate the maintenance work. Further, when the position of the first casing element is determined in the width direction by the flange part of the pressure sensor, it is possible to determine the position of the second casing element in the width direction by only fixing the second casing element to the first casing element with one or more screws.

In an example where a control board is disposed within the casing, it is desirable to configure the fluid controller in such a manner that the control board configured to receive an output signal value from the pressure sensor and to control the fluid controlling valve is provided in a space opposite from the body unit with respect to the pressure sensor and in such a manner that, on at least one of the lateral walls of the casing extending parallel to the longitudinal direction, such a section that faces the control board is arranged to be a thin section.

It is desirable to configure the fluid controller in such a manner that the body unit has a substantially parallelepiped shape and that, in a state where the casing has housed therein the fluid controlling valve and the pressure sensor, an outer surface of the casing that extends parallel to the longitudinal direction is arranged to be substantially flush with an outer surface of the body unit that extends parallel to the longitudinal direction. With these arrangements, it is possible to arrange the lateral faces of the fluid controller extending parallel to the longitudinal direction to be even without any uneven structure. Consequently, when arranging a plurality of fluid controllers side by side, it is possible to arrange the fluid controllers so as to be positioned in contact with one another.

Advantageous Effects of Invention

According to an aspect of the present invention configured as described above, it is possible to further pursue miniaturization of fluid controllers by drastically reducing the width-direction dimension from conventional examples without lowering the level of sensitivity in pressure measuring processes and by reducing the width-direction dimension of the casing while also maintaining the mechanical strength of the casing.

DESCRIPTION OF EMBODIMENTS

Figure 1:
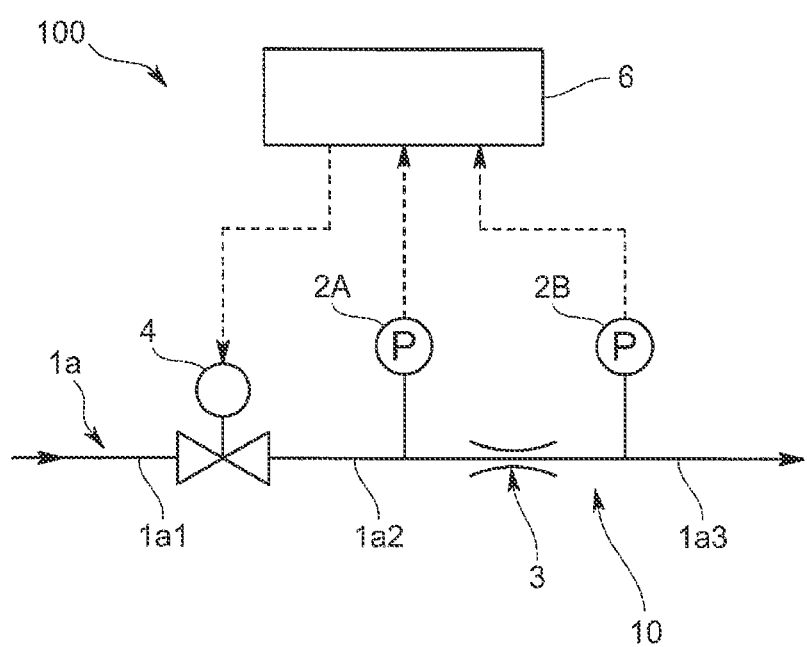
FIG. 1 is a fluid circuit diagram of a mass flow controller according to an embodiment of the present invention.

Exemplary embodiments of a fluid controller according to the present invention will be explained below, with reference to the accompanying drawings.

A fluid controller 100 according to an embodiment may be installed on a gas panel, for example, and may constitute a part of a material supply line for a semiconductor manufacturing apparatus. As shown in the fluid circuit diagram in FIG. 1 and the overall perspective view in FIG. 2, the fluid controller 100 is a mass flow controller including: a body unit 1 having an internal flow path 1a through which fluid serving as a target of flow-rate control flows; a flow rate adjusting valve 4 that is provided in the internal flow path 1a and serves as a fluid controlling valve; a flow rate measuring mechanism 10 that is provided on the downstream side of the flow rate adjusting valve 4 and measures a mass flow rate of the fluid flowing through the internal flow path 1a; and a controlling circuit 6 (not shown in FIG. 2) that controls the flow rate adjusting valve 4 in such a manner that the flow rate measured by the flow rate measuring mechanism 10 becomes equal to a predetermined target flow rate. These functional units will be explained in detail below.

Figure 2:
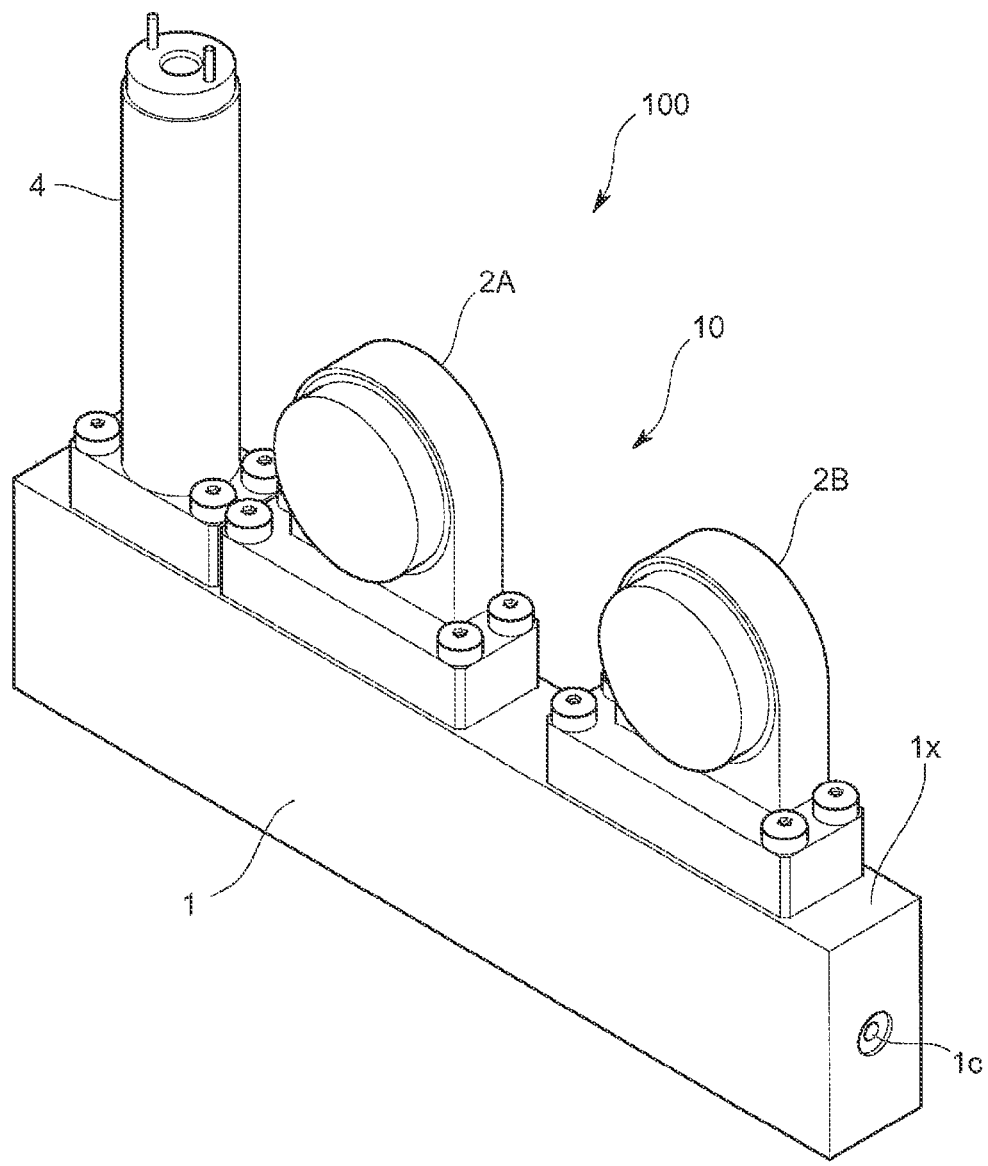
FIG. 2 is an overall perspective view of the mass flow controller without a casing attached thereto according to the embodiment.

As shown in FIG. 2, the body unit 1 has an oblong parallelepiped shape. One of the faces of the body unit 1 that extends parallel to the longitudinal direction thereof is designated as a component part attachment face 1x. It is possible to attach component parts such as the flow rate adjusting valve 4 and pressure sensors 2A and 2B only onto the component part attachment face 1x. Further, the face opposite from the component part attachment face 1x is designated as a fixation face by which the body unit 1 is fixed to a panel or the like. Further, the two other faces (hereinafter, "lateral faces") extending parallel to the longitudinal direction have nothing attached thereto, so that it is possible to arrange a plurality of body units 1 together while the lateral faces thereof are positioned in contact with or positioned close to one another.

Figure 3:
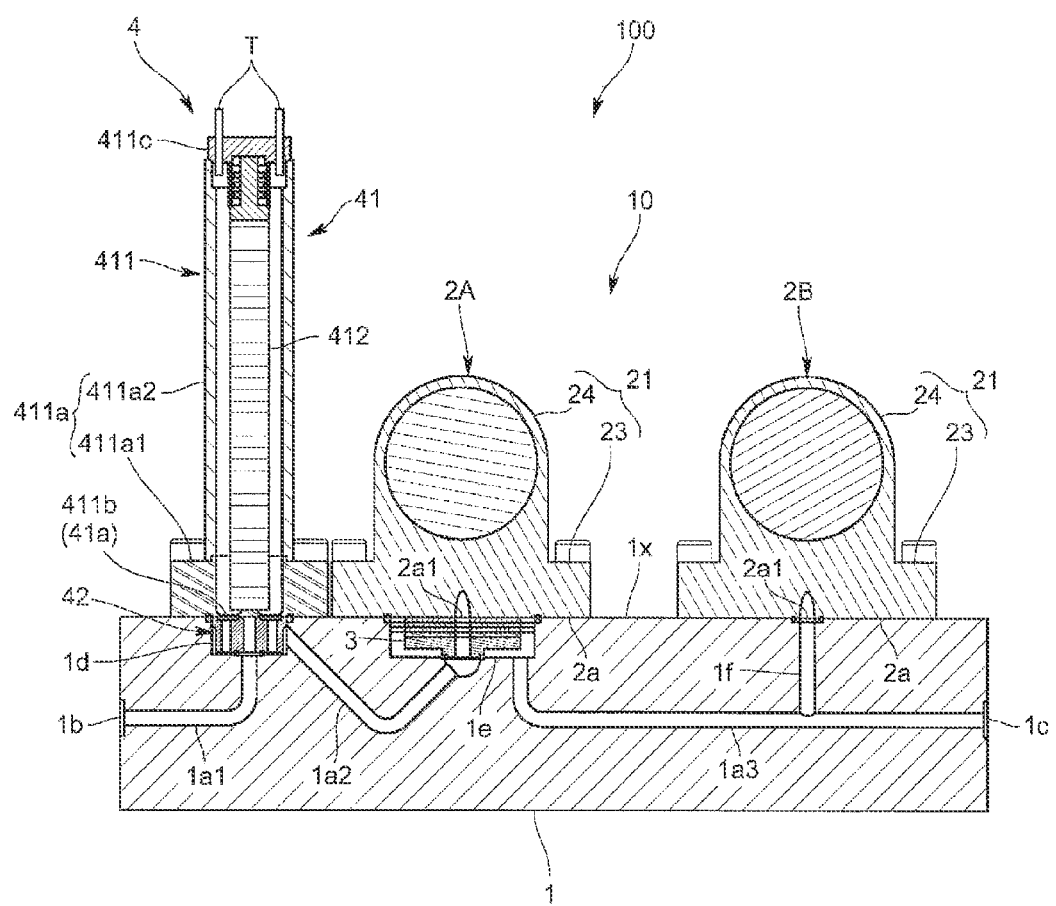
FIG. 3 is a longitudinal cross-sectional view illustrating an internal structure of the mass flow controller according to the embodiment.

The internal flow path 1a extends from one end to the other end in the longitudinal direction of the body unit 1. As shown in FIG. 3, a fluid intake port 1b and a fluid outlet port 1c thereof each have an opening in a different one of the two end faces positioned orthogonal to the longitudinal direction of the body unit 1. Further, when being viewed from a direction orthogonal to the component part attachment face 1x (hereinafter, "in a planar view"), the fluid flows substantially parallel to the longitudinal direction.

Figure 4:
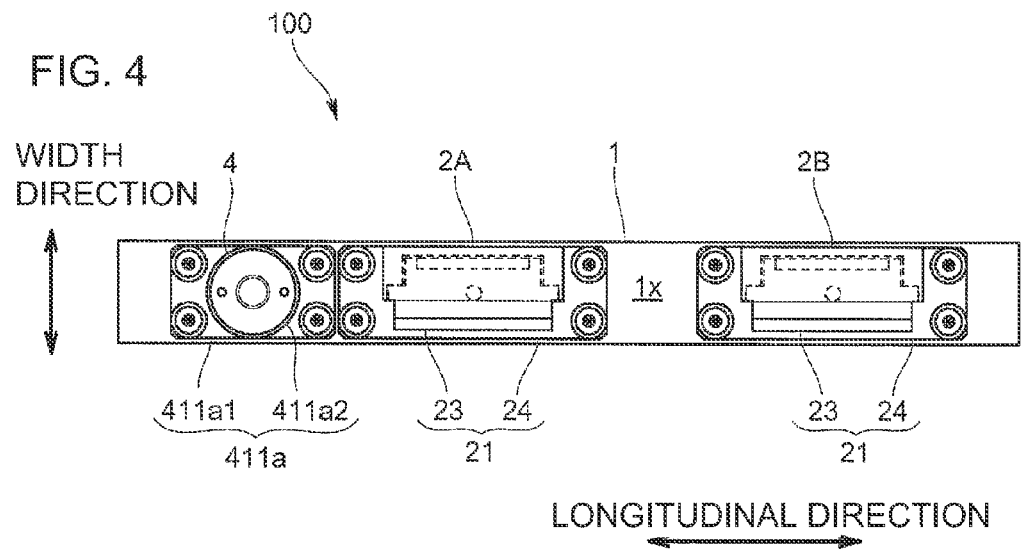
FIG. 4 is a plan view of the mass flow controller according to the embodiment.
Figure 6:
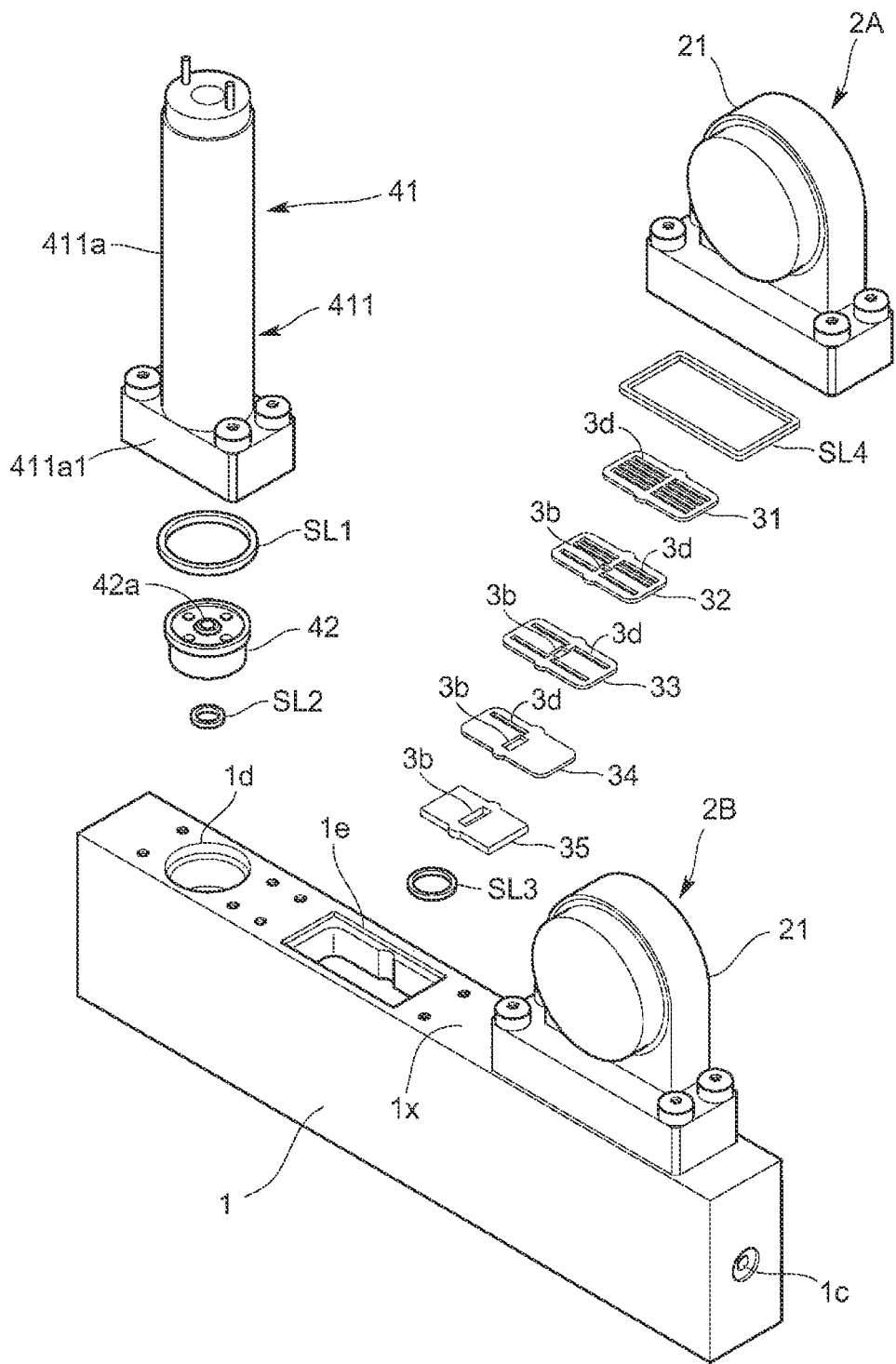
FIG. 6 is an exploded perspective view of the mass flow controller according to the embodiment.
Figure 7:
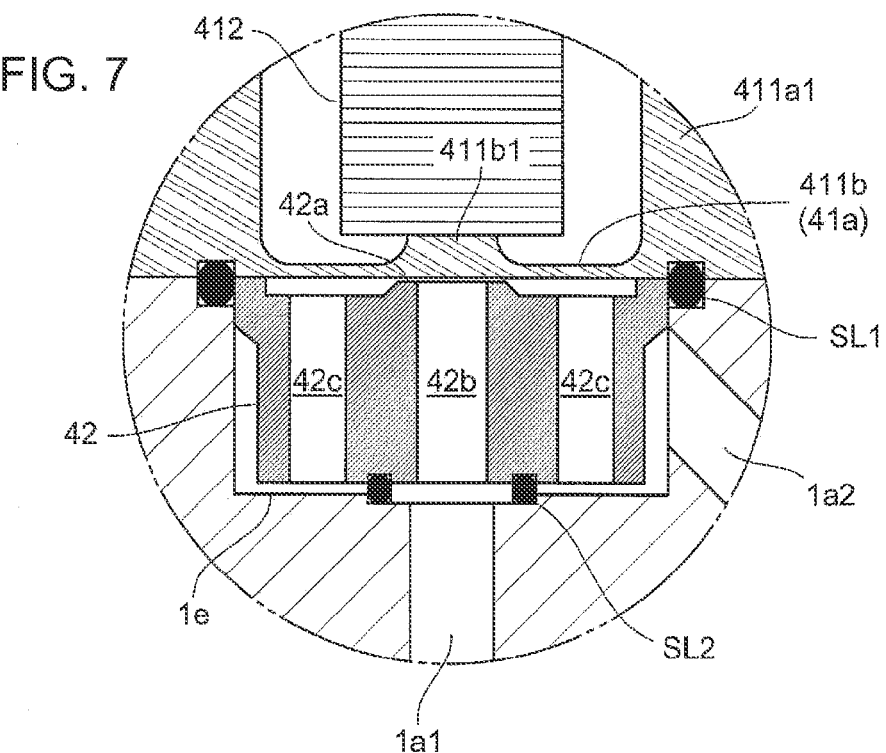
FIG. 7 is a partial cross-sectional view illustrating an internal structure of a flow rate adjusting valve according to the embodiment.

As shown in FIGS. 3, 6, and 7, the flow rate adjusting valve 4 has a columnar shape and includes a valve seat member 42 and a valve body member 41. The flow rate adjusting valve 4 is attached upright to the one end of the component part attachment face 1x positioned on the fluid intake port 1b side. The maximum width dimension of the flow rate adjusting valve 4 is arranged to be slightly smaller than the width dimension (i.e., the dimension in the direction orthogonal to the longitudinal direction) of the component part attachment face 1x. As shown in FIG. 4, the flow rate adjusting valve 4 is designed so as not to protrude from the body unit 1 outwardly in the width direction, when being attached to the body unit 1.

Of the members constituting the flow rate adjusting valve 4, the valve seat member 42 has, as shown in FIG. 7, a substantially columnar shape and has formed thereon an annular valve seat surface 42a protruding from the center of the top face. Further, the valve seat member 42 has formed therethrough a fluid intake path 42b and a fluid outlet path 42c. The fluid intake path 42b has an opening, at a first end thereof, in the center of the top face of the valve seat member 42 (more specifically, on the inside of the valve seat surface 42a) and has another opening, at a second end thereof, in the center of the bottom face of the valve seat member 42. The fluid outlet path 42c has an opening, at a first end thereof, in the periphery of the top face of the valve seat member 42 (more specifically, on the outside of the valve seat surface 42a) and has another opening, at a second end thereof, in the periphery of the bottom face of the valve seat member 42.

The valve seat member 42 is fitted into a bottomed recess 1d formed at one end of the component part attachment face 1x. The bottomed recess 1d is positioned so as to divide the internal flow path 1a into sections. Of the divided internal flow path 1a, the terminal end of an upstream-side internal flow path 1a1 has an opening in the center of the bottom face of the bottomed recess 1d, whereas the starting end of a downstream-side internal flow path 1a2 has an opening in the circumferential face at the bottom of the bottomed recess 1d.

Further, while the valve seat member 42 is fitted in the bottomed recess 1d, the second end of the fluid intake path 42b communicates, via a sealing member SL2, with the terminal end of the upstream-side internal flow path 1a1 having the opening in the center of the bottomed recess 1d, whereas the second end of the fluid outlet path 42c communicates with the starting end of the downstream-side internal flow path 1a2 because there is a gap between the valve seat member 42 and the inner circumferential surface of the bottomed recess 1d in the area spreading from the periphery of the bottom face to the bottom part of the circumferential face of the valve seat member 42.

As shown in FIGS. 3 and 7, the valve body member 41 includes: a housing unit 411 configured so that the inside thereof is hermetically sealed; and a laminated piezoelectric element 412 that has a columnar shape and is housed inside the housing unit 411.

The housing unit 411 includes: a housing 411a having an oblong cylindrical shape; a diaphragm member 411b that is in the shape of a thin plate, is elastically deformable, and is configured to hermetically close one end face of the housing 411a; and a closing member 411c configured to hermetically close the other end face of the housing 411a.

The housing 411a includes: a flange part 411a1 that has a substantially parallelepiped shape and is attached to the component part attachment face 1x so as to cover the bottomed recess 1d; and a circular cylindrical part 411a2 that has a substantially circular cylindrical shape and is joined with the flange part 411a1. As shown in FIG. 7, the diaphragm member 411b is an elastically deformable thin plate that has, at the center thereof, a protrusion 411b1 that protrudes inwardly, the diaphragm member 411b being integrally formed with the flange part 411a1. Further, a terminal T used for driving the piezoelectric element is arranged to hermetically go through the closing member 411c, so as to form a hermetic structure.

Further, the lower face (i.e., one of the end faces) of the flange part 411a1 is attached onto the component part attachment face 1x of the body unit 1 via a sealing member SL1. With this arrangement, the opening of the bottomed recess 1d formed in the body unit 1 is sealed by the lower face. Also, the diaphragm member 411b is arranged to face the valve seat surface 42a. As a result, the distance between the diaphragm member 411b and the valve seat surface 42a changes according to the expansion and contraction of the piezoelectric element 412. Thus, the diaphragm member 411b functions as a valve body 41a.

In terms of the fluid circuit, the flow rate measuring mechanism 10 includes, as shown in FIG. 1, a resistance flow path 3a provided in the internal flow path 1a; and a pair of pressure sensors 2A and 2B configured to measure the fluid pressures inside the internal flow path 1a on the upstream side and the downstream side of the resistance flow path 3a. Further, the flow rate measuring mechanism 10 is configured so as to be able to measure a flow rate of the fluid flowing through the internal flow path 1a, on the basis of the pressure values measured by the pressure sensors 2A and 2B and a resistance value of the resistance flow path 3a.

Figure 8:
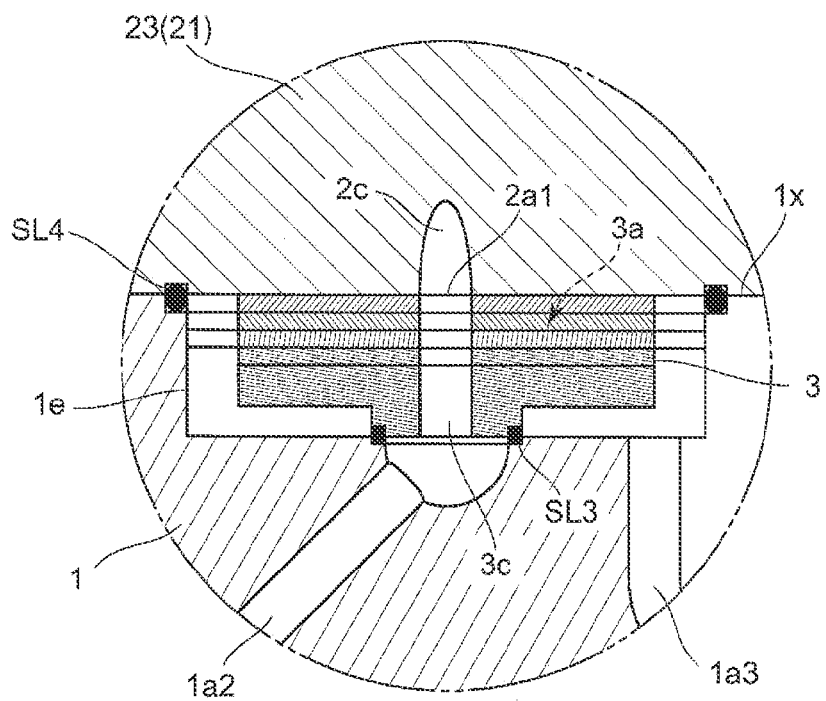
FIG. 8 is a partial cross-sectional view illustrating an internal structure observed when a fluid resistance member is housed in a recess according to the embodiment.

As shown in FIGS. 6 and 8, the resistance flow path 3a is formed in a fluid resistance member 3 which has a parallelepiped shape and in which a plurality of rectangular thin plates 31 to 35 are laminated together. In other words, as shown in FIG. 6, through holes 3b and slits 3d are formed in all or some of the thin plates, the through holes 3b overlapping one another when the thin plates are laminated together so as to form a communication path 3c that extends through the thin plates along the lamination direction, and the slits 3d each having an inner end that communicates with the communication path 3c and having an outer end that opens to a lateral face orthogonal to the longitudinal direction. Thus, when the thin plates 31 to 35 are laminated together, the resistance flow path 3a is formed by the slits 3d. By varying the shapes and/or the quantity of the slits 3d, it is possible to adjust the flow path resistance.

As shown in FIGS. 3, 5, 6, and 8, a rectangular recess 1e is formed at the center, in terms of the longitudinal direction, of the component part attachment face 1x of the body unit 1, the recess 1e dividing the internal flow path 1a into sections. The recess 1e is designed so that the fluid resistance member 3 is fitted therein while having no gap in the width direction and having gaps in the longitudinal direction of the body unit 1. Further, of the internal flow path 1a divided by the recess 1e, the terminal end of the upstream-side internal flow path 1a2 has an opening in the center of the bottom face of the recess 1e. Also, the starting end of a downstream-side internal flow path 1a3 has an opening in the periphery, in terms of the longitudinal direction, of the bottom face of the recess 1e.

While the fluid resistance member 3 is fitted in the recess 1e, one end of the communication path 3c on the bottom side is connected to the terminal end of the upstream-side internal flow path 1a2 via a sealing member SL3, whereas the outer end of the resistance flow path 3a communicates with the starting end of the downstream-side internal flow path 1a3. In other words, the upstream-side internal flow path 1a2 is connected to the downstream-side internal flow path 1a3, via the communication path 3c and the resistance flow path 3a.

As shown in FIGS. 2 to 6, each of the pressure sensors 2A and 2B includes a main body member 21 that has a flat shape and a pressure detecting element 22 housed in the main body member 21. The main body member 21 is attached to the component part attachment face 1x in such a manner that the planar section (the flat face) thereof is positioned perpendicular to the component part attachment face 1x and substantially parallel to the longitudinal direction of the body unit 1 (i.e., substantially parallel to the flowing direction of the fluid in a planar view). Further, as shown in FIG. 4 and so on, the thickness dimension of each of the pressure sensors 2A and 2B is designed to be slightly smaller than the width-direction dimension of the component part attachment face 1x, so that the pressure sensors 2A and 2B do not protrude from the body unit 1 outwardly in the width direction, when being attached thereto.

The main body member 21 includes: a flange part 23 which has a substantially parallelepiped shape and of which a predetermined face (i.e., the lower face) is attached onto the component part attachment face 1x; and a sensor main body part 24 that has a flat shape, has a pressure sensing surface therein, and is provided on such a face of the flange part 23 that is positioned opposite from the component part attachment face 1x. In the present embodiment, of the main body member 21, the thickness dimension of the flange part 23 is designed to be slightly smaller than the width-direction dimension of the component part attachment face 1x. Also, the thickness dimension of the sensor main body part 24 is designed to be smaller than that of the flange part 23, while one of the lateral faces of the sensor main body part 24 is arranged to be flush with one of the lateral faces of the flange part 23.

Figure 5:
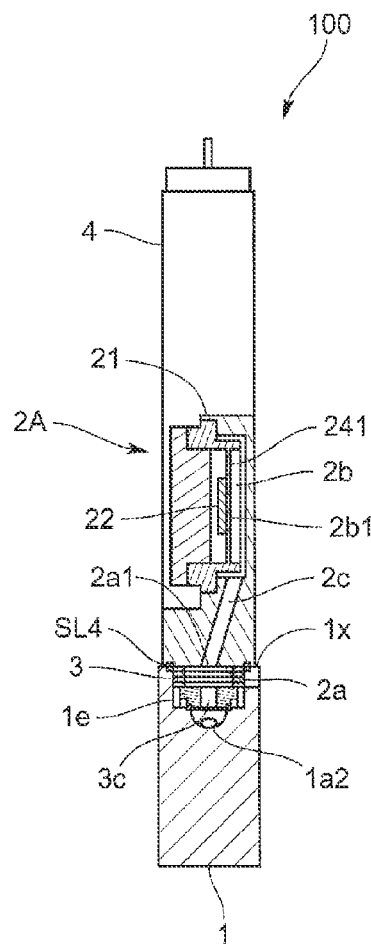
FIG. 5 is a transversal cross-sectional view illustrating an internal structure of a pressure sensor according to the embodiment.

As shown in FIG. 5, the sensor main body part 24 has formed therein: a fluid filling chamber 2b which has a thin disk shape and of which a surface 2b1 positioned parallel to the planar section is configured with a diaphragm wall 241 that is elastically deformable; and a fluid intake path 2c that allows communication between the fluid filling chamber 2b and a pressure intake port 2a1. The pressure intake port 2a1 has an opening in an attachment face 2a for the body unit 1. The fluid intake path 2c has an opening in a lateral face of the fluid filling chamber 2b, i.e., a face perpendicular to the surface 2b1. Also, the fluid intake path 2c extends in a direction that is either parallel to or at a slight angle to the surface 2b1.

The pressure detecting element 22 is configured with a piezoelectric element, for example, and is kept in contact with the rear surface (i.e., the surface opposite from the surface 2b1 serving as the pressure sensing surface) of the diaphragm wall 241. Further, when the surface 2b1 serving as the pressure sensing surface changes the position thereof by receiving a fluid pressure, the pressure detecting element 22 detects the amount of the positional change and outputs the detected amount as a pressure signal. Alternatively, another pressure detecting element may be used that is configured so as to detect a change in the capacity of the space due to the change of the diaphragm wall 241, for example, as an electrical capacity change.

Of the pair of pressure sensors 2A and 2B configured as described above, the pressure sensor 2A provided on the upstream side is attached to the center, in terms of the longitudinal direction, of the component part attachment face 1x of the body unit 1, whereas the pressure sensor 2B provided on the downstream side is attached to said other end, in terms of the longitudinal direction, of the component part attachment face 1x.

In particular, the upstream-side pressure sensor 2A is configured so that, when being attached to the body unit 1, the attachment face 2a thereof hermetically seals the opening of the recess 1e via an annular sealing member SL4 and so that the attachment face 2a thereof presses the fluid resistance member 3 within the recess 1e against the bottom face of the recess 1e so as to hold the fluid resistance member 3 therebetween. With these arrangements, there is no need to seal the fluid resistance member 3 with an exclusive-use lid or the like. It is therefore possible to lower the costs by reducing the number of component parts being used and simplifying the assembly.

Further, in this state, the communication path 3c of the fluid resistance member 3 is connected to the pressure intake port 2a1 of the upstream-side pressure sensor 2A, and also, the internal flow path 1a2 positioned on the upstream side of the resistance flow path 3a communicates with the upstream-side pressure sensor 2A via the communication path 3c.

In contrast, the internal flow path 1a3 positioned on the downstream side of the resistance flow path 3a extends along the longitudinal direction of the body unit 1 so as to reach the fluid outlet port 1c and is also connected to the pressure intake port 2a1 of the downstream-side pressure sensor 2B by a branching flow path 1f that branches off the internal flow path 1a3 en route.

The controlling circuit 6 shown in FIG. 1 is provided either as a separate member from, or as an accompaniment of, the body unit 1. The controlling circuit 6 is configured with a CPU, a memory, an I/O channel, an A/D converter, a D/A converter, and a circuit board that has installed thereon other analog or digital electric circuits. Further, as a result of the CPU and other peripheral devices working in collaboration according to a program stored in the memory, the controlling circuit 6 controls the flow rate adjusting valve 4 so as to adjust the flow rate of the fluid in the internal flow path 1a to be a set flow rate specified from an external source. An outline of the operation will be briefly explained below, together with explanation of operations of the mass flow controller 100.

When having received the output signal values from the pressure sensors 2A and 2B, the controlling circuit 6 calculates fluid pressures on the upstream side and the downstream side of the resistance flow path 3a by using the output signal values, on the basis of a predetermined conversion formula that takes offsets, coefficients, and the like into consideration. Further, the controlling circuit 6 calculates a flow rate of the fluid flowing through the resistance flow path 3a, on the basis of the calculated pressures and a fluid resistance value (a resistance coefficient) of the resistance flow path 3a measured in advance, as well as a fluid viscosity value, and the like.

When having received the set flow rate from an operator or another external device, the controlling circuit 6 calculates the difference between the set flow rate and the calculated flow rate and outputs a command signal based on the calculated difference to the flow rate adjusting valve 4 so as to expand or contract the laminated piezoelectric element 412 in such a manner that the calculated flow rate becomes close to the set flow rate. In this manner, the controlling circuit 6 changes the distance between the valve seat surface 42a and the valve body 41a so as to adjust the flow rate of the fluid flowing through the flow rate adjusting valve 4, i.e., the fluid flowing through the internal flow path 1a.

Figure 9:
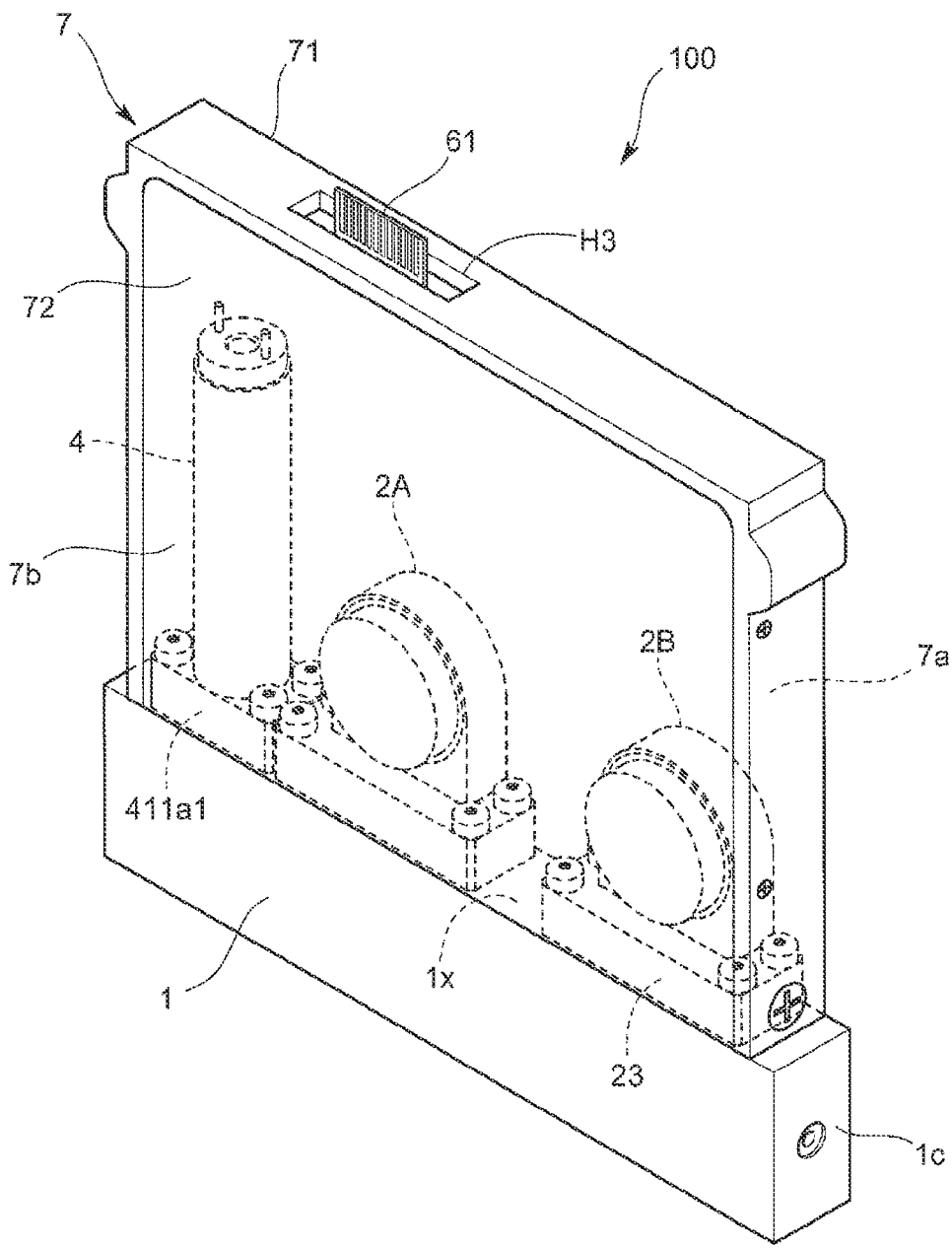
FIG. 9 is an overall perspective view of the mass flow controller having a casing attached thereto according to the embodiment.

As described above, the mass flow controller 100 according to the present embodiment has, as shown in FIG. 9, the casing 7 that houses therein the flow rate adjusting valve 4, the two pressure sensors 2A and 2B, and the controlling circuit 6, in order to provide a magnetoelectric shield for, and to provide a protection against dust for, the flow rate adjusting valve 4, the pressure sensors 2A and 2B, and the controlling circuit 6 that are attached to the body unit 1 as shown in FIG. 9 and in order to facilitate handling of the mass flow controller 100.

Figure 10:
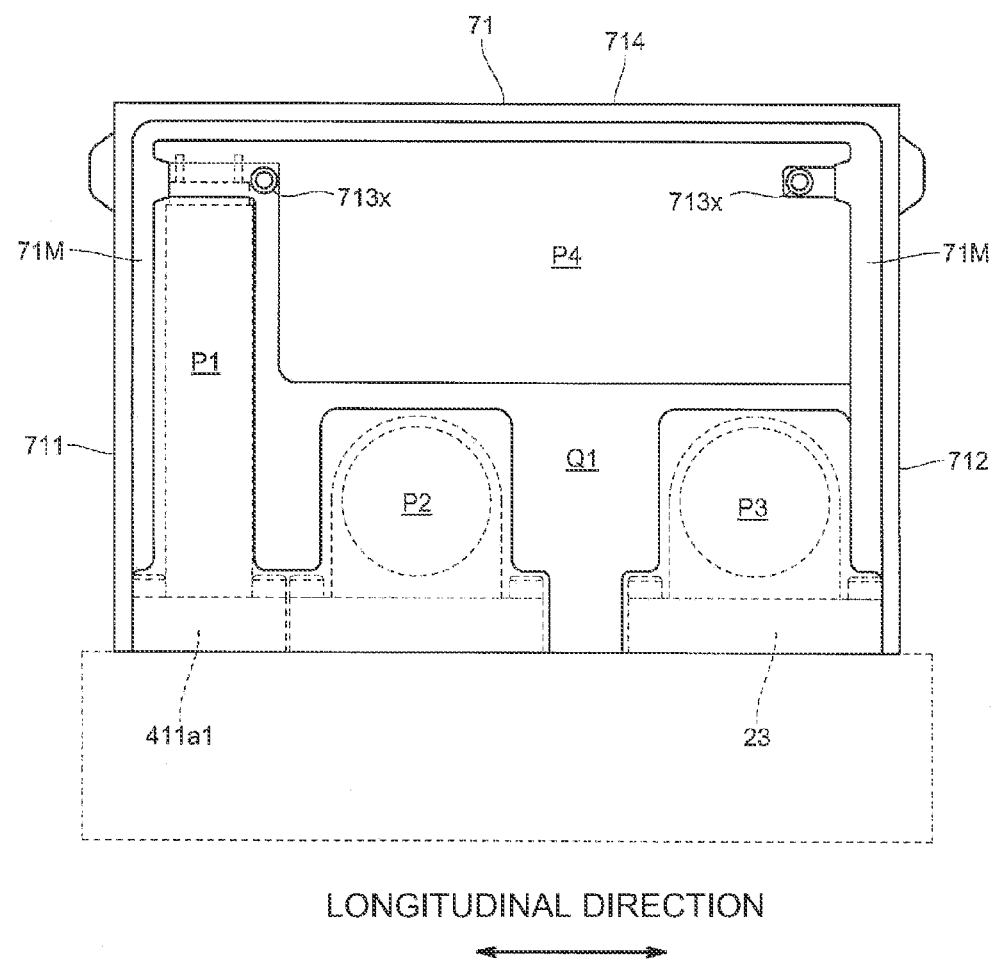
FIG. 10 is a side view of a first casing element according to the embodiment.
Figure 11:
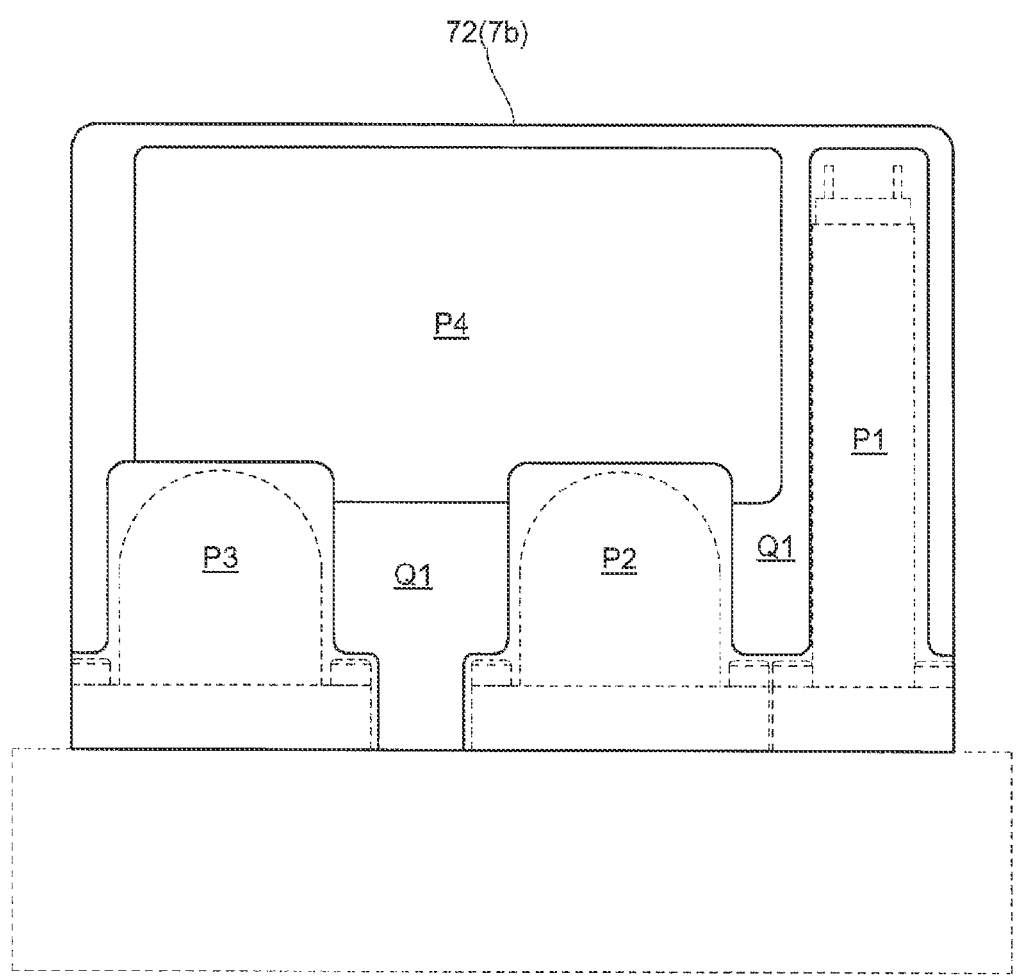
FIG. 11 is a side view of a second casing element according to the embodiment.

As shown in FIGS. 10 to 14, the casing 7 has a substantially cuboid shape and is made of metal such as aluminum, for example. At least the lateral walls (the right and left lateral walls 7a and 7b) of the casing 7 that extend parallel to the longitudinal direction are each configured in such a manner that the inner surface thereof is uneven, whereas the outer surface is substantially even. On the inner surfaces of the right and left lateral walls 7a and 7b, such sections that face the flow rate adjusting valve 4 and the pressure sensors 2A and 2B are arranged to be thin sections P1 to P3, whereas a part of such a section that does not face the flow rate adjusting valve 4 and the pressure sensors 2A and 2B is arranged to be a thick section Q1 that is thicker than the thin sections P1 to P3. In FIGS. 10 and 11, the flow rate adjusting valve 4, the pressure sensors 2A and 2B are indicated with broken lines.

In this situation, on the right and left lateral walls 7a and 7b of the casing 7, the thin sections P1 to P3 facing the flow rate adjusting valve 4 and the pressure sensors 2A and 2B are arranged to be the thinnest compared to all the other sections. The thin section P1 facing the flow rate adjusting valve 4 is arranged to have a uniform thickness throughout the entire area of the thin section P1. Also, the thin sections P2 and P3 facing the pressure sensors 2A and 2B are arranged to have a uniform thickness throughout the entire areas of the thin sections P2 and P3. Further, according to the present embodiment, the thickness of the thin section P1 facing the flow rate adjusting valve 4 is equal to the thickness of each of the thin sections P2 and P3 facing the pressure sensors 2A and 2B. Further, the thin sections P1 to P3 are formed in an area that, in a lateral view, includes the flow rate adjusting valve 4 and the pressure sensors 2A and 2B (see FIGS. 10 and 11). The thickness of each of the thin sections P1 to P3 is, for example, 0.3 mm. The thickness of the thick section Q1 may vary among different parts of the thick section Q1; however, according to the present embodiment, the thickness is uniform throughout the thick section Q1 and is, for example, 2 mm.

In the present embodiment, the controlling circuit 6 is configured so as to be attached to the casing 7. The section that faces the controlling circuit 6 is also arranged to be a thin section P4. Further, the thin section P4 facing the controlling circuit 6 is arranged to be thicker than the thin sections P1 to P3 and to be thinner than the thick section Q1. The thickness of the thin section P4 is, for example, 1 mm. The thin section P4 is formed in an area that, in a lateral view, includes the controlling circuit 6 (see FIGS. 10 and 11).

More specifically, the casing 7 includes a first casing element 71 having the shape of a substantially parallelepiped of which one of the lateral faces extending parallel to the longitudinal direction as well as the bottom face are open; and a second casing element 72 configured to close the one of the lateral faces of the first casing element 71 that is open.

Both the first casing element 71 and the second casing element 72 are each formed by applying a cutting process to a metal base material, which is made of aluminum for example. In the present embodiment, the first casing element 71 is formed by applying a cutting process to an aluminum base material having a thickness of 10 mm, for example. The second casing element 72 is formed by applying a cutting process to an aluminum base material having a thickness of 2 mm, for example.

A front plate 711 on one end in the longitudinal direction of the first casing element 71 is fixed by a screw to a lateral face on the one end in the longitudinal direction of the flange part 411$a$1 of the flow rate adjusting valve 4. A rear plate 712 on the other end in the longitudinal direction of the first casing element 71 is fixed by a screw to the lateral face on said other end in the longitudinal direction of the flange part 23 of the downstream-side pressure sensor 2B (see FIG. 10). To realize the fixation with the screws, the front and the rear plates 711 and 712 of the first casing element 71 have fixation-purpose through holes H1 formed therein (see FIG. 12). In this manner, the edges of the opening on the bottom face of the first casing element 71 are arranged to be substantially in contact with the component part attachment face 1$x$ of the body unit 1, while the first casing element 71 is fixed to the flange parts 411$a$1 and 23.

The inner surface of a lateral plate 713 extending parallel to the longitudinal direction of the first casing element 71 is arranged to be uneven, so that the sections facing the flow rate adjusting valve 4, the two pressure sensors 2A and 2B, and the controlling circuit 6 are configured as the thin sections P1 to P4, as explained above. Further, the inner surface of the lateral plate 713 of the first casing element 71 has bosses 713$x$ formed thereon that are used for fixing the controlling circuit 6 with screws. Because the first casing element 71 is formed by the cutting process, the bosses 713$x$ are integrally formed with the lateral plate 713. The lateral plate 713 constitutes the right lateral wall 7$a$.

Figure 12:
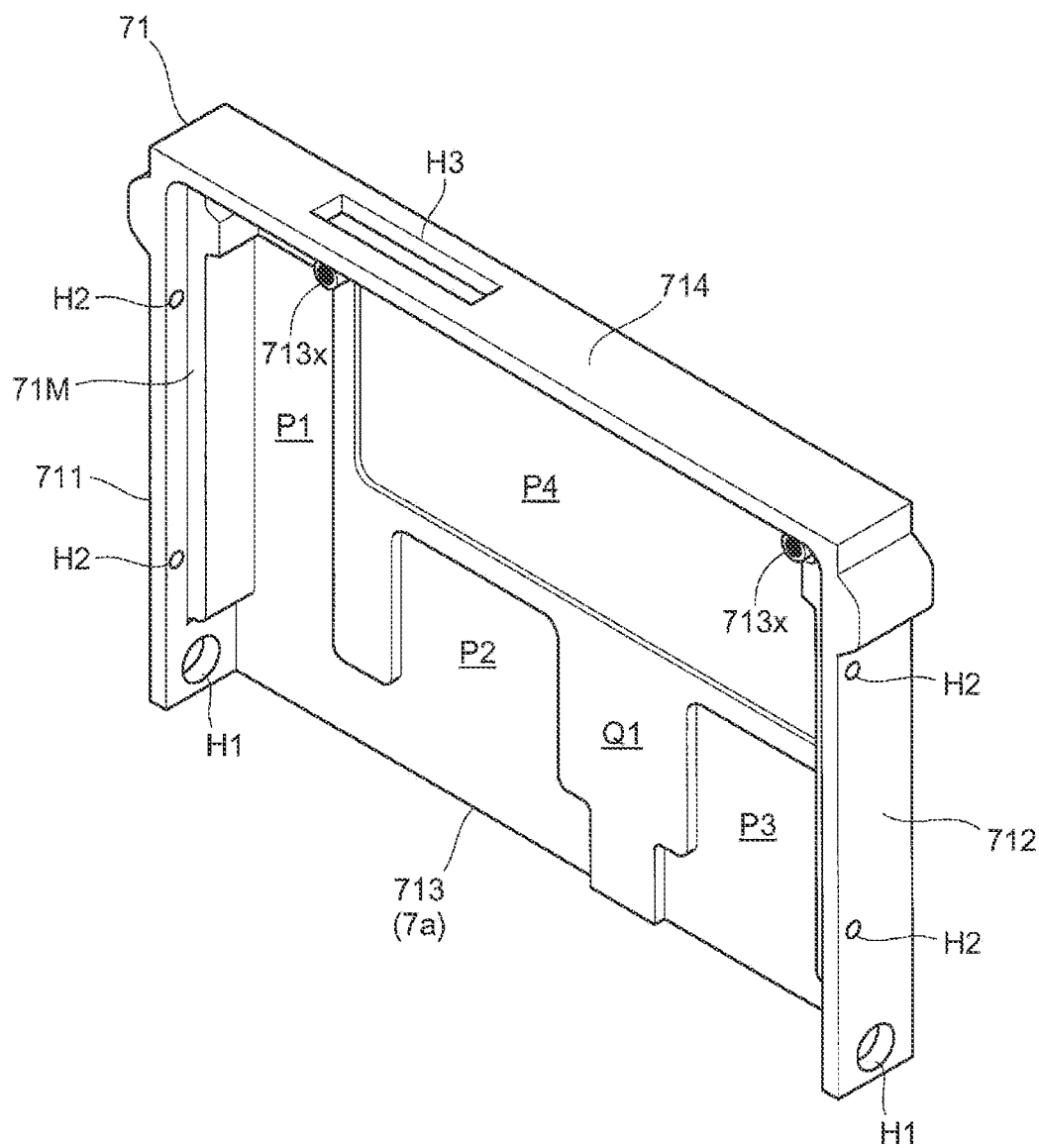
FIG. 12 is a perspective view of the first casing element according to the embodiment.
Figure 13:
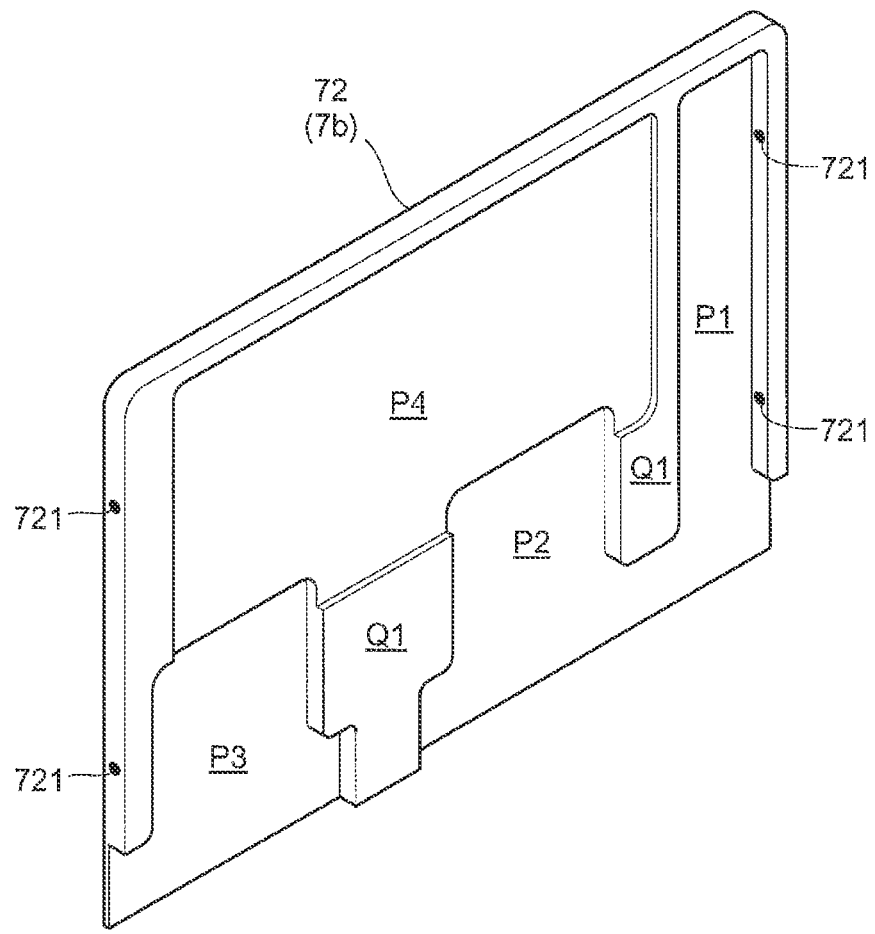
FIG. 13 is a perspective view of the second casing element according to the embodiment.

The front and the rear plates 711 and 712 of the first casing element 71 have a plurality of through holes H2 formed therein that are used for fixing the second casing element 72 with screws (see FIG. 12). Further, a housing step 71M into which the second casing element 72 is fitted is formed along the opening edges of the front and the rear plates 711 and 712 and an upper plate 714 that define the lateral-face opening of the first casing element 71 (see FIGS. 11 and 12). By fitting the second casing element 72 into the housing step 71M of the first casing element 71, the position of the second casing element 72 in the longitudinal direction is determined. Further, the upper plate 714 of the first casing element 71 has formed therein a through hole H3 having, for example, a rectangular shape extending along the longitudinal direction. An output terminal 61 of the controlling circuit 6 can be extended to the outside via the through hole H3 (see FIGS. 9 and 12).

The second casing element 72 is in the shape of a substantially rectangular flat plate so as to close the lateral-face opening of the first casing element 71. The second casing element 72 is fixed to the first casing element 71 by screws. Like the first casing element 71, the inner surface of the second casing element 72 is arranged to be uneven, so that such sections that face the flow rate adjusting valve 4, the two pressure sensors 2A and 2B, and the controlling circuit 6 are arranged to be the thin sections P1 to P4, as explained above. Further, female screw holes 721 used for fixing the second casing element 72 to the first casing element 71 by screws are formed in the thick section Q1 provided in the peripheral parts on both ends in the longitudinal direction of the second casing element 72 (see FIG. 13). The second casing element 72 constitutes the left lateral wall 7$b$.

Figure 14:
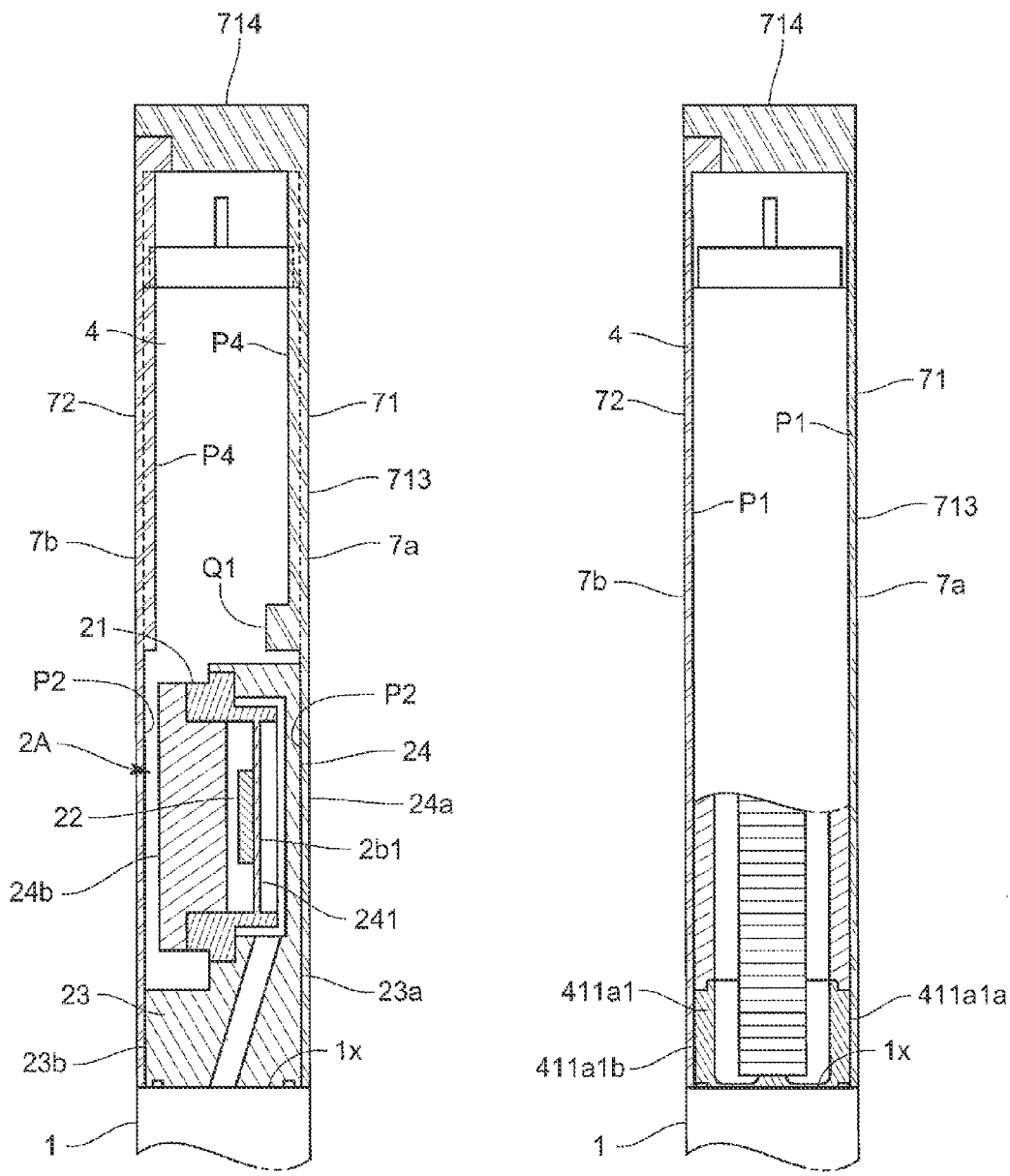
FIG. 14 presents partial cross-sectional views illustrating the flow rate adjusting valve and the pressure sensor with lateral walls on the left and right according to the embodiment.
Figure 15:
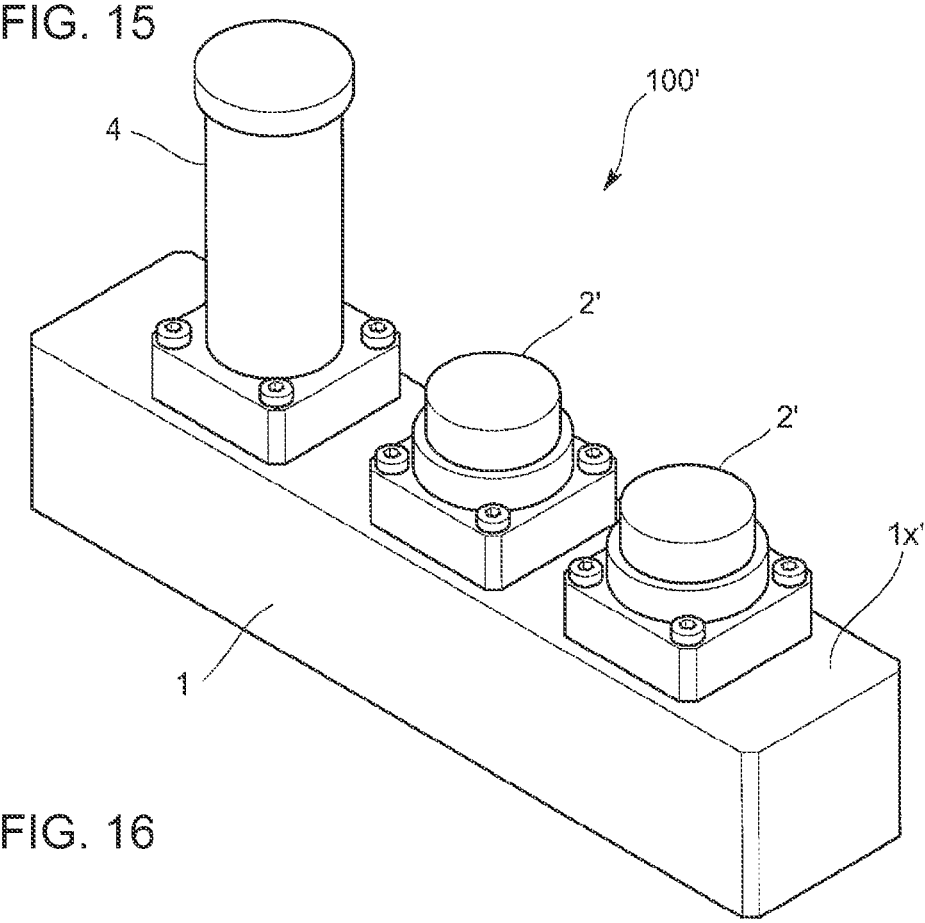
FIG. 15 is an overall perspective view of a conventional mass flow controller.

As shown in FIG. 14, the positions in the width direction of the first casing element 71 and the second casing element 72 configured as described above are determined by two lateral faces 23$a$ and 23$b$ extending parallel to the longitudinal direction of each of the flange parts 23 of the pressure sensors 2A and 2B and by two lateral faces 411$a$1$a$ and 411$a$1$b$ extending parallel to the longitudinal direction of the flange part 411$a$1 of the flow rate adjusting valve 4. More specifically, the position of the first casing element 71 in the width direction is determined by bringing the thin sections P1 to P3 formed on the inner surface of the first casing element 71 into contact with the lateral faces 23$a$ and 411$a$1$a$ (provided on a first side in terms of the width direction) of the flange parts 23 of the pressure sensors 2A and 2B and the flange part 411$a$1 of the flow rate adjusting valve 4, the thin sections P1 to P3 each facing the corresponding lateral face. In the present embodiment, because the lateral faces 23$a$ provided on the first side of the flange parts 23 of the pressure sensors 2A and 2B are flush with lateral faces 24$a$ provided on the first side of the sensor main body parts 24, the thin sections P2 and P3 are also in contact with the lateral faces 24$a$ provided on the first side of the sensor main body parts 24. While the position thereof is determined in this manner, the first casing element 71 is attached to the body unit 1, by putting screws into female screw holes provided in the flange part 411$a$1 of the flow rate adjusting valve 4 and the flange part 23 of the down-stream side pressure sensor 2B, via the through holes H1 formed in the front and rear plates 711 and 712 of the first casing element 71.

Further, the position of the second casing element 72 in the width direction is determined by bringing the thin sections P1 to P3 formed on the inner surface of the second casing element 72 into contact with the lateral faces 23$b$ and 411$a$1$b$ (provided on a second side in terms of the width direction) of the flange parts 23 of the pressure sensors 2A and 2B and the flange part 411$a$1 of the flow rate adjusting valve 4, the thin sections P1 to P3 each facing the corresponding lateral face. In the present embodiment, the thin sections P2 and P3 are not in contact with the lateral faces 24$b$ provided on the second side of the sensor main body parts 24, because the lateral faces 24$b$ provided on the second side of the sensor main body parts 24 are positioned more inward, in terms of the width direction, than the lateral faces 23$b$ provided on the second side of the flange parts 23 of the pressure sensors 2A and 2B. In other words, the thin sections P2 and P3 of the second casing element 72 are arranged not to be in contact with the outer surfaces 24$b$ of the lateral walls of the sensor main body parts 24 facing the pressure detecting elements 22. In this situation, because a signal processing circuit for the pressure sensors is provided on the lateral faces 24$b$ provided on the second side of the sensor main body parts 24, it is possible to prevent the electric elements and the terminals in the signal processing circuit from short-circuiting by ensuring that the thin sections P2 and P3 are not in contact with the lateral faces 24$b$. Further, it is also possible to make the S/N ratio of the pressure signals obtained by the pressure detecting elements 22 as high as possible. While the position thereof is determined in this manner, the second casing element 72 is attached to the first casing element 71, by putting screws into the female screw holes 721 provided in the second casing element 72, via the through holes H2 formed in the front and rear plates 711 and 712 of the first casing element 71.

Further, in the state where the first casing element 71 and the second casing element 72 are attached to the body unit 1 in this manner, the outer surface of the first casing element 71 and the outer surface of the second casing element 72 are arranged to be substantially flush with the lateral faces of the body unit 1. In other words, the thickness of each of the thin sections P2 and P3 that are formed on the first casing element 71 and the second casing element 72 so as to face the pressure sensors 2A and 2B is substantially equal to the dimension of the gap between the corresponding lateral face of the flange parts 23 of the pressure sensors 2A and 2B and the corresponding lateral face of the body unit 1. Further, the thickness of each of the thin sections P1 that are formed on the first casing element 71 and the second casing element 72 so as to face the flow rate adjusting valve 4 is substantially equal to the dimension of the gap between the corresponding lateral face of the flange parts 411a1 of the flow rate adjusting valve 4 and the corresponding lateral face of the body unit 1.

In the mass flow controller 100 according to the present embodiment configured as described above, each of the pressure sensors 2A and 2B is configured so that the pressure sensing surface 2b1 thereof stands perpendicularly to the attachment face 2a thereof. In addition, the pressure sensors 2A and 2B are attached to the component part attachment face 1x while being positioned in series, in such a manner that the pressure sensing surfaces 2b1 extend parallel to the flowing direction of the fluid in a planar view. Consequently, it is possible to reduce the dimension in the width direction so that the pressure sensors 2A and 2B each have an oblong shape in a planar view, while keeping the areas of the pressure sensing surfaces 2b1 large so as to maintain a high level of sensitivity.

Further, on the right and left lateral walls 7a and 7b of the casing 7, such sections that face the flow rate adjusting valve 4 and the pressure sensors 2A and 2B are arranged to be the thin sections P1 to P3. As a result, it is possible to bring inward, in terms of the width direction, the outer surfaces of the right and left lateral walls 7a and 7b of the casing 7. It is therefore possible to make the dimension of the casing 7 as small as possible. Further, on the right and left lateral walls 7a and 7b of the casing 7, at least a part of such a section that does not face the flow rate adjusting valve 4 and the pressure sensors 2A and 2B is arranged to be the thick section Q1. As a result, it is possible to maintain the mechanical strength of the casing 7 with the thick sections Q1. In this situation, it is also acceptable to arrange only such sections that face either the flow rate adjusting valve 4 or the pressure sensors 2A and 2B to be the thin sections. With this arrangement also, it is possible to achieve the advantageous effect where the mass flow controller 100 is thinner. However, the effect achieved in this case is lower than the effect achieved in the embodiment described above where the sections facing the flow rate adjusting valve 4 and the pressure sensors 2A and 2B are arranged to be the thin sections.

Further, because the controlling circuit 6 is attached to the first casing element 71, whereas the signal processing circuit for the pressure sensors 2A and 2B is disposed so as to face the second casing element 72, it is possible to easily perform maintenance on the controlling circuit 6 and the signal processing circuit, only by removing the second casing element 72 from the first casing element 71. Similarly, it is also possible to easily perform maintenance on the wiring and the like of the fluid controlling valve 4 and the pressure sensors 2A and 2B, only by removing the second casing element 72 from the first casing element 71.

Another incidental advantageous effect is that, because the flow rate adjusting valve 4 and the fluid resistance members 3 are provided on the component part attachment face 1x of the body unit 1 so as to be positioned next to one another, it is possible to make the volume of the internal flow path 1a connecting these constituent elements together as small as possible. It is therefore possible to reduce the time difference between the detection of the flow rate and the control of the flow rate. Consequently, it is possible to significantly improve responsiveness of the control exercised by the mass flow controller 100.

The present invention is not limited to the exemplary embodiments described above. For example, there is no need to accurately arrange the pressure sensing surfaces to be positioned parallel to the longitudinal direction and perpendicular to the component part attachment face. Even if the pressure sensing surfaces are slightly tilted, it is still possible to achieve the advantageous effect where the width-direction dimension is reduced compared to conventional examples.

In the embodiments described above, on each of the left and right lateral walls, the entirety of the area except for the sections facing the flow rate adjusting valve, the two pressure sensors, and the controlling circuit is arranged to be the thick section. However, the present invention is not limited to this example. It is acceptable to form both thin sections and thick sections in the area excluding the sections facing those constituent elements.

Further, it is theoretically possible to provide the flow rate adjusting valve on the downstream side of the pressure sensors. Further, if the downstream-side pressure and the upstream-side pressure in the mass flow controller are in a constant state, it is not necessarily required to provide the pair of pressure sensors. It is acceptable to provide only one of the pressure sensors. Besides the mass flow controller, it is also possible to configure a pressure controller by using a fluid controlling valve and a pressure sensor provided on either the upstream side or the downstream side of the fluid controlling valve.

It is also possible to use the mass flow controller according to the present embodiment in usage other than semiconductor manufacturing processes.

Figure 16:
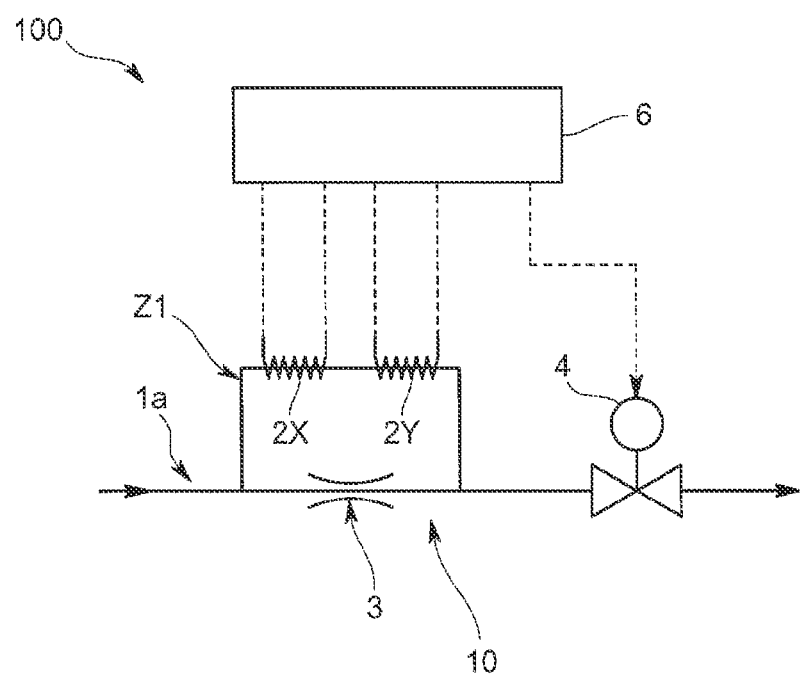
FIG. 16 is a fluid circuit diagram of a mass flow controller according to a modified embodiment.

The fluid controller according to the embodiment described above is a differential-pressure-type mass flow controller that includes the fluid controlling valve and the pressure sensors. However, the present invention is also applicable to a thermal mass flow controller. More specifically, the mass flow controller 100 includes, as shown in FIG. 16, the body unit 1 having the internal flow path 1a through which fluid flows; the flow rate measuring mechanism 10 including a sensor flow path Z1 that branches from the internal flow path in the body unit 1 and two or more (two in the example shown in FIG. 16) resistance members 2X and 2Y provided in the sensor flow path Z1; and the fluid controlling valve 4 that is provided on the downstream side of the flow rate measuring mechanism 10 and that controls the fluid flowing through the internal flow path 1a. The resistance members 2X and 2Y are configured to both generate heat and sense heat. In this situation, the controlling circuit 6 has the functions of: a flow rate calculating unit including a bridge circuit, an amplifying circuit, a correcting circuit, and the like that obtain an output signal from the flow rate measuring mechanism 10 and that calculate a flow rate of a sample gas flowing through the internal flow path 1a; and a valve controlling unit that controls the degree of opening of the fluid controlling valve 4, on the basis of a signal value (a measured flow rate value) indicated by a measured flow rate signal output by the flow rate calculating unit and a set flow rate value that is a target flow rate indicated by a set flow rate signal input by an input means (not shown in the drawings). When three resistance members are used, the resistance members are arranged in the following order starting from the upstream side: a heat sensing resistance member, a heat generating resistance member, and a heat sensing resistance member.

In this situation, the lateral walls 7a and 7b of the casing 7 extending parallel to the longitudinal direction have the sensor flow path Z1 of the flow rate measuring mechanism 10 formed therewith. Such sections that face a sensor flow path forming member provided on the top face of the body unit 1, the resistance members 2X and 2Y provided in the surroundings of the sensor flow path forming member, and the fluid controlling valve 4 are arranged to be thin sections. At least a part of such a section that does not face the sensor flow path forming member, the resistance members 2X and 2Y, and the fluid controlling valve 4 is arranged to be a thick section that is thicker than the thin sections. If the sensor flow path forming member and the resistance members 2X and 2Y are housed in a housing, such sections that correspond to the housing are arranged to be thin sections on the lateral walls 7a and 7b of the casing 7 extending parallel to the longitudinal direction.

In the embodiment described above, the pressure sensors are attached in such a manner that the pressure sensing surfaces thereof are positioned substantially perpendicular to the component part attachment face and substantially parallel to the longitudinal direction; however, it is also acceptable to attach the pressure sensors in such a manner that the pressure sensing surfaces thereof are positioned substantially parallel to the component part attachment face, like in the conventional example. Even in that situation, because such sections that face the fluid controlling valve and the pressure sensors are arranged to be the thin sections on the lateral walls of the casing extending parallel to the longitudinal direction, it is possible to bring inward, in terms of the width direction, the outer surfaces of the lateral walls of the casing extending parallel to the longitudinal direction. It is therefore possible to reduce the width-direction dimension of the casing that accounts for the width-direction dimension of the body unit. Consequently, it is possible to reduce the width-direction dimension of the body unit and to make the width-direction dimension of the casing as small as possible. As a result, when a plurality of fluid controllers are arranged side by side, it is possible to avoid the situation where the casings thereof prevent the fluid controllers from being positioned close to one another. Further, on each of the lateral walls of the casing extending parallel to the longitudinal direction, at least a part of such a section that does not face the fluid controlling valve and the pressure sensors is arranged to be the thick section. Thus, it is possible to enhance the mechanical strength of the lateral walls of the casing with the thick sections. It is therefore possible to maintain the mechanical strength of the casing. When a focus is placed on the mechanical strength of the lateral walls of the casing, it is also possible to arrange the outer surfaces of the lateral walls of the casing to be uneven. However, in that situation, when a plurality of fluid controllers are arranged side by side, the projections constituting the uneven surface on the outer surfaces of the casings would interfere with one another and would prevent the fluid controllers from being positioned close to one another.

In addition to the above explanation, it is possible to combine a part or all of the exemplary embodiments and the modified embodiments together as appropriate. Needless to say, the present invention is not limited to the embodiments described above and may be modified in various manners without departing from the gist thereof.

REFERENCE CHARACTERS LIST 100 fluid controller
1 body unit
1a internal flow path
1x component part attachment face
2A, 2B pressure sensor
2b1 pressure sensing surface
23 flange part of pressure sensor
24 sensor main body part
4 flow rate adjusting valve (fluid controlling valve)
6 controlling circuit
7 casing
7a, 7b lateral walls extending parallel to longitudinal direction (right and left lateral walls)
71 first casing element
72 second casing element
P1-P4 thin section
Q1 thick section

The invention claimed is:

1. A fluid controller comprising:
a body unit having an internal flow path through which fluid flows;
a fluid controlling valve that is attached to the body unit and controls the fluid flowing through the internal flow path;
a pressure sensor that is attached to the body unit and detects a pressure in the internal flow path; and
a casing that houses therein the fluid controlling valve and the pressure sensor attached to the body unit, wherein
the body unit extends in a longitudinal direction, while one of the faces thereof extending parallel to the longitudinal direction is designated as a component part attachment face, the fluid controlling valve is attached to the component part attachment face, whereas the pressure sensor is attached to the component part attachment face in such a manner that a pressure sensing surface thereof is positioned substantially perpendicular to the component part attachment face and substantially parallel to the longitudinal direction, and
on at least one of lateral walls of the casing extending parallel to the longitudinal direction, an inner surface thereof is arranged to be uneven so that a section that faces the fluid controlling valve and the pressure sensor is arranged to be a thin section, whereas at least another section that does not face the fluid controlling valve and the pressure sensor is arranged to be a thick section that is thicker than the thin section.

2. The fluid controller according to claim 1, wherein the casing is formed by applying a cutting process to a metal base material.

3. The fluid controller according to claim 1, wherein on said at least one of the lateral walls of the casing, the thin section facing the fluid controlling valve and the pressure sensor is arranged to be thinnest compared to all other sections.

4. The fluid controller according to claim 1, wherein
the pressure sensor includes: a flange part which has a substantially parallelepiped shape and of which a predetermined face is attached onto the component part attachment face and a sensor main body part that has a flat shape, has a pressure sensing surface therein, and is provided on such a face of the flange part that is positioned opposite from the component part attachment face, and
a position of the casing in a width direction orthogonal to the longitudinal direction is determined by bringing the thin section facing the pressure sensor into contact with a lateral face of the flange part that extends parallel to the longitudinal direction.

5. The fluid controller according to claim 1, wherein the body unit has a substantially parallelepiped shape, and in a state where the casing has housed therein the fluid controlling valve and the pressure sensor, an outer surface of the casing that extends parallel to the longitudinal direction is arranged to be substantially flush with an outer surface of the body unit that extends parallel to the longitudinal direction.

6. A fluid controller comprising:
a body unit extends in a longitudinal direction, having an internal flow path through which fluid flows;
a fluid controlling valve that is attached to the body unit and controls the fluid flowing through the internal flow path;
a pressure sensor that is attached to the body unit and detects a pressure in the internal flow path; and
a casing that houses therein the fluid controlling valve and the pressure sensor attached to the body unit, wherein
on at least one of lateral walls of the casing extending parallel to the longitudinal direction, an inner surface thereof is arranged to be uneven so that a section that faces the fluid controlling valve and the pressure sensor is arranged to be a thin section, whereas at least another section that does not face the fluid controlling valve and the pressure sensor is arranged to be a thick section that is thicker than the thin section.

* * * * *